United States Patent [19]
George

[11] Patent Number: 5,137,326
[45] Date of Patent: Aug. 11, 1992

[54] CONVERTIBLE-TYPE PASSENGER CAR

[75] Inventor: Albert R. George, Ithaca, N.Y.

[73] Assignee: Cornell Research Foundation, Inc., Ithaca, N.Y.

[21] Appl. No.: 562,870

[22] Filed: Aug. 3, 1990

[30] Foreign Application Priority Data

Aug. 4, 1989 [DE] Fed. Rep. of Germany ....... 3925809

[51] Int. Cl.$^5$ .............................................. B60H 1/28
[52] U.S. Cl. ................................... 296/208; 296/186; 454/146
[58] Field of Search ...................... 296/186, 208; 98/2, 98/2.16

[56] References Cited

U.S. PATENT DOCUMENTS

| | | | |
|---|---|---|---|
| 1,201,780 | 10/1916 | Westendarp et al. | 98/2 |
| 2,319,035 | 5/1943 | Breese | 98/2.16 |
| 2,523,923 | 9/1950 | Rodert | 296/208 X |
| 2,665,091 | 10/1953 | Geiger | 196/208 X |
| 2,696,774 | 12/1954 | Bayley | 296/208 X |
| 3,526,428 | 9/1970 | Porsche et al. | 98/2 X |
| 4,747,636 | 5/1988 | Harasaki et al. | 296/208 X |
| 4,819,550 | 4/1989 | Ioka | 98/2.16 X |
| 4,970,946 | 11/1990 | Ivey | 98/2 |

FOREIGN PATENT DOCUMENTS

686063 1/1953 United Kingdom ..................... 98/2

*Primary Examiner*—Dennis H. Pedder
*Attorney, Agent, or Firm*—Jones, Tullar & Cooper

[57] ABSTRACT

The body of the convertible has, in addition to the cross sections of the heater and/or vent installation, a further flow conduit (5) with a relatively large flow cross section, by means of which an airflow (accordance with arrow 7) from the outside into the front area (6) of the passenger compartment can be attained in a controlled way. In this way that amount of air is purposefully supplied back to the passenger compartment, which is swept along or drawn off (arrows 12) by the air which, deflected by the inclined windshield (9), flows off with increased speed towards the back (arrow 1). In this way annoying draft conditions are avoided which occur in convertibles when the underpressure, which is created because of suction, generates an air flow directed from the back into the front area of the passenger compartment.

4 Claims, 2 Drawing Sheets

CONVERTIBLE-TYPE PASSENGER CAR

FIELD OF THE INVENTION

The invention relates to a passenger car of the convertible type with a device for reducing draft conditions due to reverse air flow and which are annoying for the passengers.

BACKGROUND OF THE INVENTION

Essentially, draft conditions which appear when driving a convertible-type automobile with the top down are caused by the external air flow entraining passenger compartment air after flowing over the hood and windshield of the automobile. This air flow passes over the top of the passenger compartment and draws air out of it, creating a low pressure region in the seating area of the vehicle. The air drawn from this region is replenished by an air flow originating in the area of the back of the vehicle and directed forward. This air flow is annoying to passengers, since it strikes the passengers' back, and also causes an increase in the noise level. Even if the side windows of the vehicle are raised, the annoying airflow is not significantly reduced.

To solve the foregoing problem, it has been repeatedly proposed (DE-B-35 37 644 or EP-A-233 777) to dispose shields crosswise behind the seats, which shields extend upwardly from the middle of the vehicle. In order to allow a small portion of the reverse air flow to remain so as to retain for the occupants a feeling of being in a convertible,, it is also already known (DE-B-38 36 375) to provide a net which lets some air through, instead of a solid shield.

Also already known is a visually less noticeable windscreen (DE-B-37 19 115), which covers the space between the two seat backs of the front seats. Although this solution results in an improvement, it cannot prevent all of the air flow; for example, it does not stop the flow of air along the outside of the seats.

SUMMARY OF THE INVENTION

It is an object of the present invention to provide in a convertible-type passenger car apparatus for reducing or eliminating annoying draft conditions in the vehicle passenger compartment without the necessity of using crosswise shields, which are not sufficiently effective and which are sometimes considered to be visually unattractive. This object is attained, in accordance with the present invention, by the provision of a compensating air flow leading from outside the vehicle to the front area of the passenger compartment.

Briefly, and in accordance with the invention, additional air requirements created in the area of the passenger compartment of a moving convertible-type automobile are replenished, not by reverse air flow from the back of the vehicle, but by means of an increased flow cross section from the front of the vehicle. Thus, reverse flow originating in the area of the back of the vehicle no longer forms. This is accomplished by providing air inlets of high capacity leading into the passenger compartment, providing considerably larger flow cross sections than are available through normal heater or vent devices. The high capacity inlets provide a compensating flow over a wide area to create a more gentle, even air flow through the passenger compartment, which replenishes the amount of air which is swept up; that is entrained by external air flowing back over the windshield and over the passenger compartment.

BRIEF DESCRIPTION OF THE DRAWINGS

The foregoing objects, features and advantages of the invention will be described in detail below by means of an exemplary embodiment, illustrated in the accompanying drawings, in which.

DETAILED DESCRIPTION OF THE PREFERRED EMBODIMENT

Figure 1:
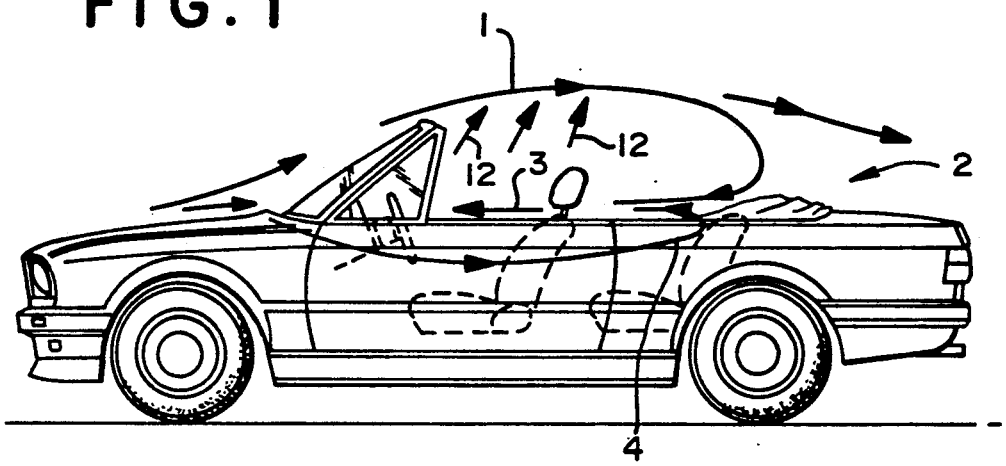
FIG. 1 is a side elevational view of a convertible-type automobile illustrating the air flow in accordance with the state of the art, without the present device for preventing draft conditions.

FIG. 1 illustrates the cause of the forward-directed air flow which occurs in the interior of a convertible-type vehicle with the top down. The air flow forming above the vehicle and in back of the windshield, particularly over the region of the passenger compartment, is indicated by the heavy flow arrow 1. There, in the transition area where the external air flows over and mixes with the comparatively lower velocity air in the passenger compartment below, the very fast flowing external air sweeps along or entrains, a certain amount of internal air and thereby generates an underpressure in the interior of the passenger compartment. Flow around the windshield and along the length of the vehicle may also contribute to the entrainment. The resulting underpressure in turn causes a partial reversal of the flow 1 in the area of the back 2 of the convertible, producing a forward flow in the area of the seats and between the seats, as indicated by the arrow 3. The air flow indicated by arrow 3 is also partially supplemented by a lateral flow along the vehicle in accordance with arrow 4, with air thus being drawn laterally into the compartment by the underpressure formed by the external flow 1.

To avoid this forward-directed air flow 3, a compensating flow conduit 5 (FIG. 2) has been provided in addition to the air inlets provided by the conventional heater and/or vent installation in the vehicle. In accordance with the embodiment illustrated in FIG. 2, the compensating conduit 5 has a considerably larger flow cross section than the heater/air conditioner vents to accommodate an air flow, in accordance with arrow 7, leading from the outside of the vehicle to the front part 6 of the passenger compartment. In this way it is possible to supply the passenger compartment with a sufficient amount of air, in a controlled manner, to counteract or to compensate for the reverse flow 3 than would be possible via the normal heater and vent installation. It is possible, with the compensating vent, to resupply specifically that portion of air which is carried away by the aspiration (entrainment) caused by the external flow 1 above and behind the windshield, and to prevent creation of the annoying airflow directed against the vehicle occupants from the back in prior convertibles. Of course, the at least one additional flow conduit 5 does not preclude that the flow cross sections for the controlled venting of the passenger compartment, could be increased over what has been customary, by widening the conduits of the heating and/or air conditioning installation in order to supplement provision of the air flow required for adequate compensation of the reverse flow.

Figure 2:
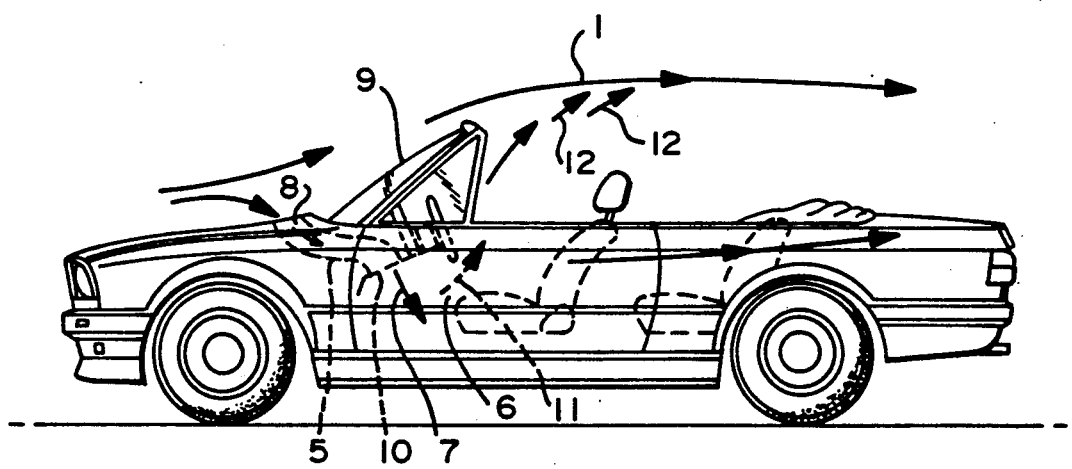
FIG. 2 is a side elevational view of a convertible-type automobile incorporating compensating air flow into the passenger compartment in accordance with the invention.

In accordance with FIG. 2, the entry opening 8 for the at least one additional flow conduit 5 may be provided in the area of the body located in front of the windshield 9. The outlet opening 10 for the additional air flow into the passenger compartment is here exemplified, for practical reasons, as being underneath the dashboard. The additional air reaching the front floor area then flows, distributed over a large surface, slowly upwardly in accordance with the dashed flow arrow 11, where it contacts, and is swept along, as indicated by the small arrows 12, with the external air indicated by the flow arrow 1.

Figure 3:
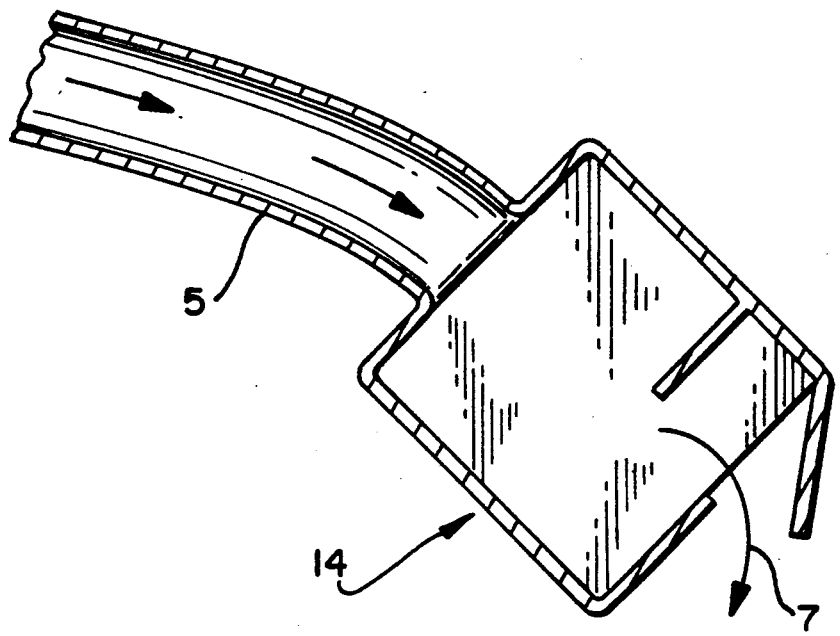
FIG. 3 is a cross-sectional view of an air flow baffle for the passenger compartment.

The air flow conduit 5 may direct air into the front area 6 of the passenger compartment in the manner indicated in FIG. 2, or may be connected at its outlet end through a baffle 14 such as that illustrated in FIG. 3. The baffle serves to distribute the air flow 7 over a large area to produce a gentle, even air flow to replenish the air which is aspirated out of the compartment. The baffle can extend laterally across the passenger compartment to reduce the back draft on occupants of the vehicle due to the reverse air flow 3, while also preventing undesired drafts at the feet of the occupants from flow 7.

Figure 4:
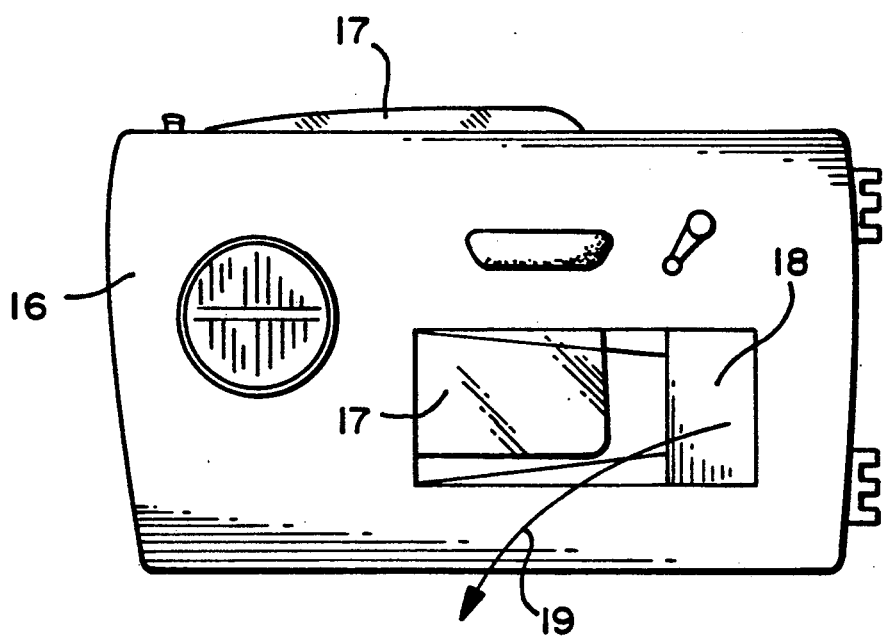
FIG. 4 illustrates in diagrammatic form a door-located compensating air flow inlet.

The compensating air flow required to prevent or reduce the reverse flow 3 can also reach the passenger compartment through other openings, for example through special conduits formed in the doors, as illustrated in FIG. 4. The door 16, shown with the window 17 down, may have a conduit 18 leading from the forward edge of the door rearwardly to an outlet channel, or baffle, which directs incoming compensating air, indicated by arrow 19, into the passenger compartment. As indicated, the air flow preferably is directed into the passenger compartment near the bottom of the door and over a wide area to produce an even, gentle flow having sufficient volume to compensate for the reverse flow 3. Air may be directed into the conduit 18 from a corresponding conduit in the vehicle body which joins conduit 18 when the door is closed. It is also possible to form the outlet openings through which the compensating air flow reaches the passenger compartment in the floor area of the convertible, or, if desired, air flow passageways may be provided in two or more of these areas. It is advantageous to dispose the entry opening 8 for the at least one additional conduit 5 in an area of the vehicle body having an overpressure caused by the external air flow when the vehicle is driven, and which depends on the speed of the convertible. In this way the amount of compensating air supplied the passenger compartment is more closely related to the amount of air swept out of the passenger compartment by the air stream 3, thereby avoiding the need for continual adjustment of the air flow. Shut-off controls for the air flow conduits 5 or 18 may be provided to permit the additional flow conduit to be partially or completely closed, in case a strong return air flow from the back to the front of the vehicle is desired, perhaps for a short time, or when the convertible top is raised.

In order to test the effectiveness of providing a compensating air flow, it was determined that an area Ao would have to be supplied by a volume of air $v \cdot A_o$, where v is the velocity of the entrained air flow and $A_o$ is the open area of the passenger compartment of the vehicle which is exposed to the external stream of air, where passengers are to be protected. This area is approximately the area of the folded convertible roof, plus the area of the side and rear windows, all of which areas contribute to the generation of a reverse flow. The rearmost part of the passenger compartment can be excluded from the area $A_o$. For a typical convertible, this area may be between 4 and 6 m$^2$.

To supply the volume of air $v \cdot A_o$, it is necessary to have an air inlet having an area $Ai = A_o \cdot v/Ui$, where v is the velocity of the entrained, or compensating air, and Ui is the exterior air free stream velocity at the input of the air inlet. It has been found that the inlet area should be between 1/50 and 1/20 of the value of $A_o$ if Ui is approximately the free stream velocity. This range will accommodate the needed air flow whether the side windows are up or down. Wind tunnel tests of the effect of compensating air flow using inlet areas of 0.08 m$^2$ with the windows up and 0.11 m$^2$ with the windows down were made, and measurements of the noise generated by turbulent reverse flow were made by means of an acoustic dummy. These measurements were made in a test vehicle wherein the compensating air inlets were located in the doors of the vehicle, in the manner illustrated in FIG. 4, the sound measurements being made at head level ("Top" in the following table), at about waist level ("Bottom" in the following tables) and at two locations therebetween. Table I shows the results of tests run with the vehicle windows up.

TABLE I

| Probe | No Inlets U = 120 kmh | Full Inlets U = 120 kmh | Small Inlets U = 120 kmh | Small Inlets U = 8 kmh |
|---|---|---|---|---|
| 1 (Top) | 6 | −2.5 | 2−6 | 2−4 |
| 2 | 8.4 | −2.2 | 2.2 | 1 |
| 3 | 7 | −0.5 | 5 | 3.4 |
| 4 (Bottom) | 5 | −3 | 5.4 | 2.5 |

Table II shows the results of tests run with the vehicle windows down. In this case, however, the bottom portion of the window interfered with the conduit outlet in the vehicle door, so two sets of measurements were made. The first was made with the window fully down ("90 mm gap") and the second was made with the windows partially raised ("180 mm gap").

TABLE II

| Probe | No Inlet U= 120 kmh | Full Inlet U = 120 kmh 90 mm gap | Full Inlet U = 80 kmh 90 mm gap | Full Inlet U = 80 kmh 180 mm gap | Full Inlet U = 80 kmh scaled to 120 kmh 180 mm gap |
|---|---|---|---|---|---|
| 1 (Top) | 7 | 6.4 | 4.4 | 3.4 | 5.1 |
| 2 | 6.4 | 5.4 | 4.4 | 0.8 | 1.2 |
| 3 | 8.4 | 4 | 3.4 | 1.8 | 2.7 |

TABLE II-continued

| Probe | No Inlet U= 120 kmh | Full Inlet U = 120 kmh 90 mm gap | Full Inlet U = 80 kmh 90 mm gap | Full Inlet U = 80 kmh 180 mm gap | Full Inlet U = 80 kmh scaled to 120 kmh 180 mm gap |
| --- | --- | --- | --- | --- | --- |
| 4 (Bottom) | 7.6 | 3.4 | 3.2 | 3 | 4.5 |

As illustrated by the foregoing test results, significant reductions in the acoustic measurements of draft velocities were produced by the provision of compensating air flow into the passenger compartment.

The inlet air is best supplied by a natural flow which is dependent on the velocity of the free air stream, so that the compensating flow is correctly proportioned to vehicle speed. If a fan is used to produce the desired flow, then it will have to be adjusted as car speed is changed in order to provide the required compensation.

Although the present invention has been described in terms of preferred embodiments, it will be appreciated that modifications may be made without departing from the true spirit and scope thereof, as set forth in the following claims.

What is claimed is:

1. A method for substantially reducing draft conditions in a passenger compartment of an open top type passenger vehicle caused by air flowing over a windshield disposed across a front area of said passenger compartment and creating a vacuum in said passenger compartment which causes a flow of air from a back area of said passenger compartment to said front area, said method comprising the steps of:
   (a) determining a flow volume of air which is necessary to be admitted to said passenger compartment to substantially eliminate said reverse flow of air, said flow volume of air being proportional to the velocity of the air flowing over said windshield;
   (b) providing an air flow conduit in said vehicle connected at a first end to an air inlet disposed in a front portion of said vehicle in front of said windshield and at a second end to at least a first outlet disposed in said passenger compartment, said air conduit having a large flow cross section capable of carrying said determined flow volume of air; and,
   (c) ducting said determined flow volume of air through said conduit from said front portion of said vehicle to said passenger compartment to substantially reduce the flow of air from the back area to the front area of said passenger compartment.

2. The method of claim 1 wherein the step of providing an air flow conduit further comprises disposing said at least first outlet in a door of said passenger vehicle.

3. The method of claim 1 wherein the step of providing an air flow conduit further comprises disposing said at least first outlet underneath a dashboard located in said passenger compartment.

4. The method of claim 3 wherein said step of providing an air flow conduit further comprises disposing a baffle at said at least first outlet which serves to distribute air flow from said conduit over a large area of said passenger compartment.

* * * * *